(No Model.)
A. BERNRITTER.
SCROLL SAW ARTICLE.
No. 321,571. Patented July 7, 1885.
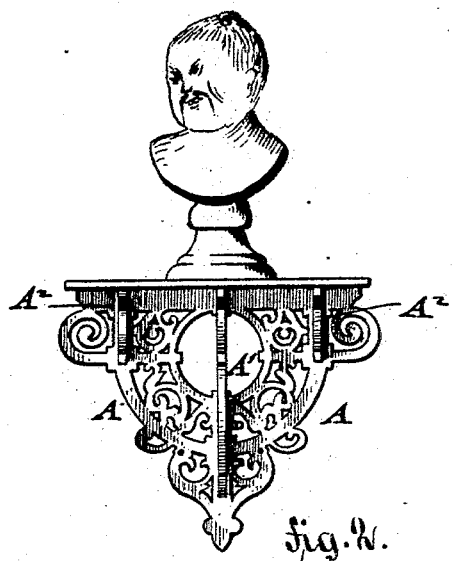
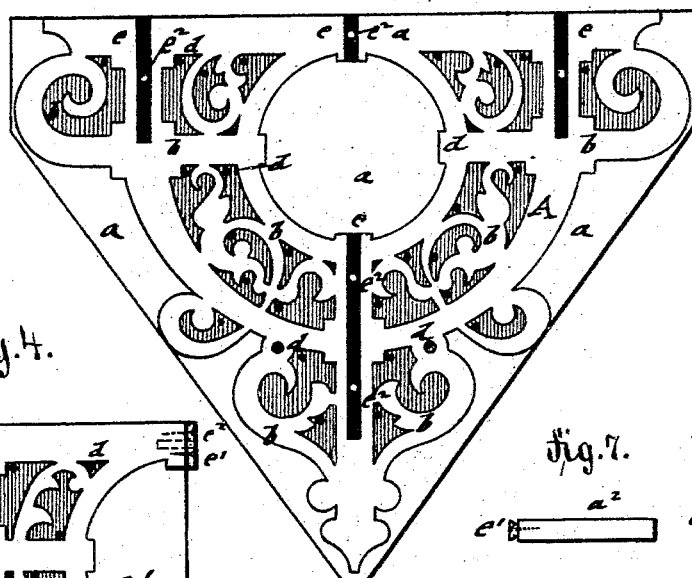
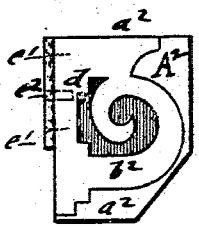
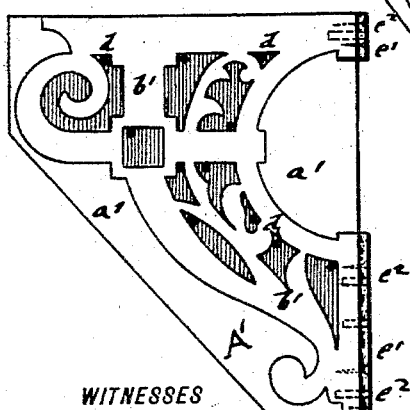
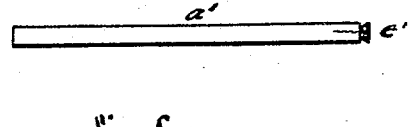
WITNESSES
W. Rosenbaum
Martin Petry
INVENTOR
Adolph Bernritter
By his Attorneys
Goepel & Raegener

UNITED STATES PATENT OFFICE.

ADOLPH BERNRITTER, OF NEW YORK, N. Y.

SCROLL-SAW ARTICLE.

SPECIFICATION forming part of Letters Patent No. 321,571, dated July 7, 1885.

Application filed May 21, 1885. (No model.)

*To all whom it may concern:*

Be it known that I, ADOLPH BERNRITTER, of the city, county, and State of New York, have invented certain new and useful Improvements in Scroll-Saw Articles, of which the following is a specification.

This invention relates to an improved scroll-saw article in which the parts composing the same are prepared in partly-finished state, so as to facilitate the sawing out of the parts and completing of the article.

The invention consists of a plate or piece for scroll-saw work provided with designs for the scroll-saw, which are covered by a coating of varnish, the portions to be cut out being provided with parallel lines within the contours and with holes for the admission of the saw.

The invention consists, secondly, of a plate or piece for scroll-saw work, which is provided with dovetailed recesses or grooves with dovetailed edge strips for connecting the parts after the same have been sawed out.

In the accompanying drawings, Figure 1 represents a front view of a console or other scroll-saw article made according to my invention. Figs. 2, 3, and 4 are details of the individual parts of the same, partly finished and ready for being worked upon by the saw; and Figs. 5, 6, and 7 are top edge views of the parts shown in Figs. 2, 3, and 4.

Similar letters of reference indicate corresponding parts.

Referring to the drawings, A A' A² represent the different parts which compose a console or other article that is made of plates or pieces sawed out by a scroll-saw. The parts A A' A² are made of corresponding pieces or plates $a$ $a'$ $a^2$ of wood of suitable thickness, which are prepared in a partly-finished state by transferring the design to one surface of the same either by transfer-sheets or by printing, or in any suitable manner. The portions $b$ $b'$ $b^2$, which are to be sawed out by the saw on the pieces $a$ $a'$ $a^2$, are shaded off by parallel lines within the contours of the designs, which not only indicate directly what parts are to be worked upon by the saw, but which also assist in properly guiding the saw along the outlines of the different ornamentations.

To prevent the blurring of the design on the plates or pieces $a$ $a'$ $a^2$, the contours and parallel lines within the same are fixed by a coat of varnish, so that the different pieces can be handled and packed for shipment without any danger of effacing or interrupting the continuity of the contours of the designs. The plates or pieces $a$ $a'$ $a^2$ are further provided at the corners of the portions $b$ $b'$ $b^2$ with holes $d$ $d$, for the convenient admission of the saw in sawing out these portions. The plate or piece $a$ is connected at the points where the plates or pieces $a'$ $a^2$ are attached to the same by dovetailed grooves $e$ $e$ of suitable length, and at the edges of the plates or pieces $a'$ $a^2$ with dovetailed tongues $e'$, which are attached by glue and nails, as shown in Figs. 3, 4, 5, and 7. The sawed-out parts A A' A² are joined together by first connecting the dovetailed grooves and tongues, and then passing additional fastening-screws through the grooves and tongues of said parts, for which purpose the grooves and tongues are also provided with holes $e^2$. By the interlocking grooves and tongues of the different parts A A' A² the connection of the parts is greatly facilitated, so that the work of finishing the scroll-saw articles is thereby simplified and rendered easier and more perfect.

All the parts belonging to a scroll-saw article are put up in a box in partly-finished state, with the designs printed thereon, holes bored, grooves cut out and tongues applied thereto, together with a picture of the finished article and instructions for completing the same. A large variety of articles of different designs can thus be made up, so that the sawing out and finishing scroll-saw articles gives great pleasure, as the tedious preparation of the work heretofore required is already accomplished, and thereby a much larger scope of application given to this class of work.

Having thus described my invention, I claim as new and desire to secure by Letters Patent—

1. As a new article of manufacture, a piece or plate of scroll-saw work provided with designs for the scroll-saw, said designs being marked with parallel lines within the contours of the parts to be cut out, and protected by a coating of varnish, substantially as set forth.

2. As a new article of manufacture, a plate or piece of scroll-saw work provided with designs for the scroll-saw, the portions to be cut out being provided with parallel lines within the contours of the designs, and covered by a coating of varnish for fixing the same to the wood, and with holes for the admission of the saw, substantially as set forth.

3. As a new article of manufacture, a plate or piece of scroll-saw work provided with a design fixed thereto, holes within the portions to be cut out for the admission of the saw, and with dovetailed grooves or tongues, substantially as set forth.

4. As a new article of manufacture, a plate or piece of scroll-saw work provided with a design fixed thereon by a coating of varnish, holes within the parts to be cut out for the admission of the saw, interlocking dovetailed grooves or tongues, and holes through the grooves or tongues for the fastening devices, substantially as set forth.

In testimony that I claim the foregoing as my invention I have signed my name in presence of two subscribing witnesses.

ADOLPH BERNRITTER.

Witnesses:
 PAUL GOEPEL,
 CARL KARP.